United States Patent
Sugiura et al.

(10) Patent No.: US 9,932,820 B2
(45) Date of Patent: Apr. 3, 2018

(54) DYNAMIC CALIBRATION OF AXIAL ACCELEROMETERS AND MAGNETOMETERS

(71) Applicant: Schlumberger Technology Corporation, Sugar land, TX (US)

(72) Inventors: Junichi Sugiura, Bristol (GB); Christopher C. Bogath, Cheltenham (GB); Adam Bowler, Oxford (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 779 days.

(21) Appl. No.: 14/337,036

(22) Filed: Jul. 21, 2014

(65) Prior Publication Data

US 2015/0027779 A1   Jan. 29, 2015

Related U.S. Application Data

(60) Provisional application No. 61/858,806, filed on Jul. 26, 2013.

(51) Int. Cl.
| | |
|---|---|
| G01C 17/38 | (2006.01) |
| E21B 47/024 | (2006.01) |
| G01C 25/00 | (2006.01) |

(52) U.S. Cl.
CPC ............ *E21B 47/024* (2013.01); *G01C 17/38* (2013.01); *G01C 25/005* (2013.01)

(58) Field of Classification Search
CPC ... E21B 47/024; E21B 47/022; G01C 25/005; G01C 17/38; G01V 7/00
See application file for complete search history.

(56) References Cited

U.S. PATENT DOCUMENTS

| | | | |
|---|---|---|---|
| 3,791,043 A | 2/1974 | Russell | |
| 5,113,953 A | 5/1992 | Noble | |
| 5,265,682 A | 11/1993 | Russell et al. | |
| 5,307,885 A | 5/1994 | Kuwana et al. | |
| 5,353,884 A | 10/1994 | Misawa et al. | |
| 5,603,386 A | 2/1997 | Webster | |
| 6,092,610 A | 7/2000 | Kosmala et al. | |
| 6,109,372 A | 8/2000 | Dorel et al. | |

(Continued)

OTHER PUBLICATIONS

Sognnes et al., Improving MWD Survey Accuracy in Deviated Wells by Use of a New Triaxial Magnetic Azimuth Correction Method, Jun. 16-19, 1996, SPWLA 37th Annual Logging Symposium, pp. 1-14.*

(Continued)

*Primary Examiner* — Toan Le

(57) ABSTRACT

A method to perform a drilling operation. The method includes calibrating an axial survey sensor of a bottom hole assembly (BHA) by obtaining, from the axial survey sensor, a data log as a first function of azimuthal angle within a borehole, generating, by a computer processor of the BHA and using a pre-determined algorithm, a fitted curve as a second function of the azimuthal angle, wherein the fitted curve is generated based on the data log to represent a calibration error of the axial survey sensor, and extracting, by the computer processor of the BHA, a calibration parameter from the fitted curve. Accordingly, the drilling operation is performed using at least the axial survey sensor based on the calibration parameter.

15 Claims, 7 Drawing Sheets

(56) References Cited

U.S. PATENT DOCUMENTS

| | | |
|---|---|---|
| 6,179,067 B1 | 1/2001 | Brooks |
| 6,290,003 B1 | 9/2001 | Russell |
| 6,427,783 B2 | 8/2002 | Krueger et al. |
| 6,808,027 B2 | 10/2004 | McLoughlin et al. |
| 7,950,473 B2 | 5/2011 | Sugiura |
| 2004/0149004 A1 | 8/2004 | Wu |
| 2005/0056461 A1 | 3/2005 | Estes et al. |
| 2008/0294343 A1* | 11/2008 | Sugiura ................ E21B 47/022 |
| | | 702/6 |
| 2012/0205154 A1 | 8/2012 | Lozinsky et al. |
| 2013/0151158 A1 | 6/2013 | Brooks et al. |

OTHER PUBLICATIONS

International search report and written opinion for the equivalent PCT patent application No. PCT/US2014/048040 dated Nov. 10, 2014.

* cited by examiner

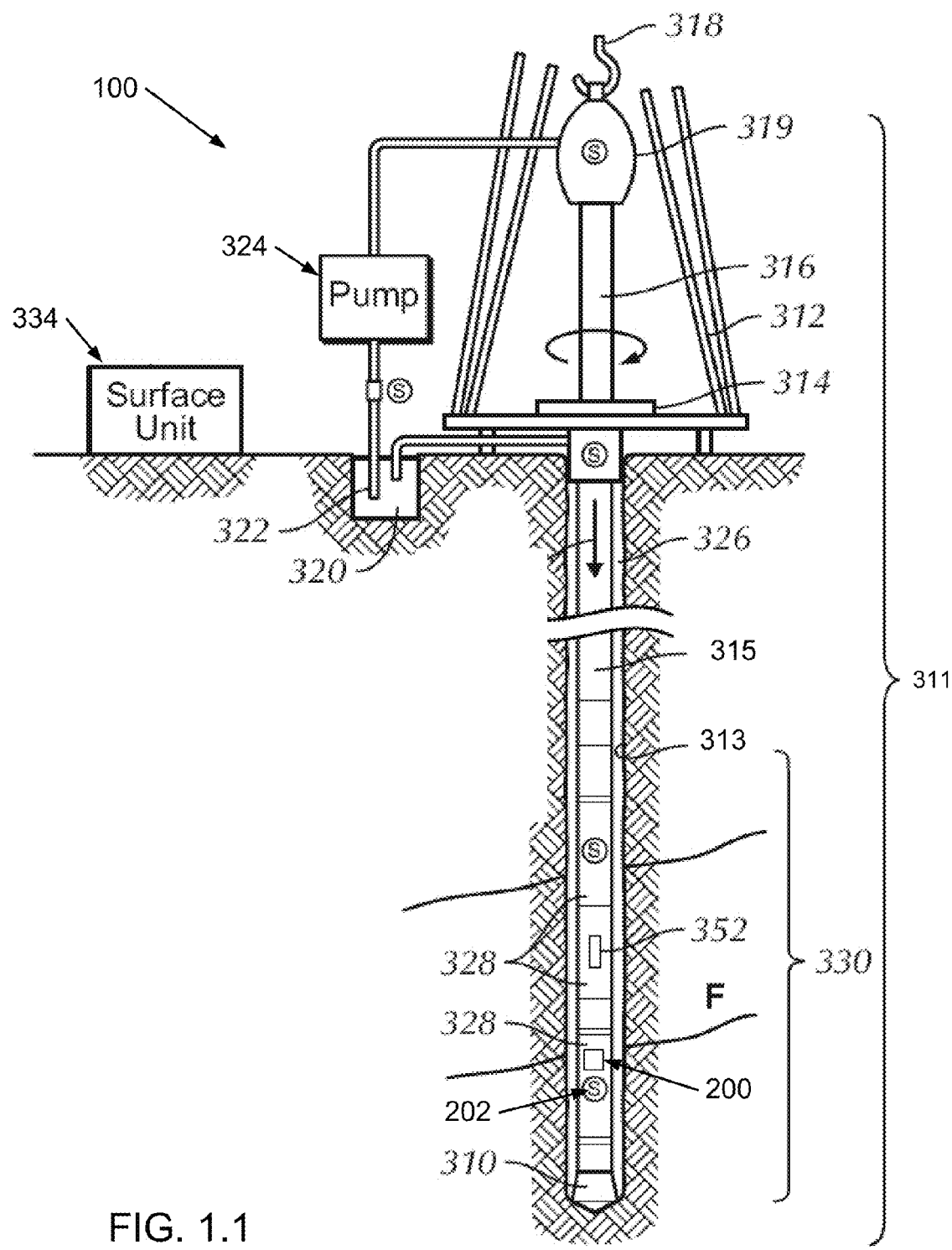
FIG. 1.1

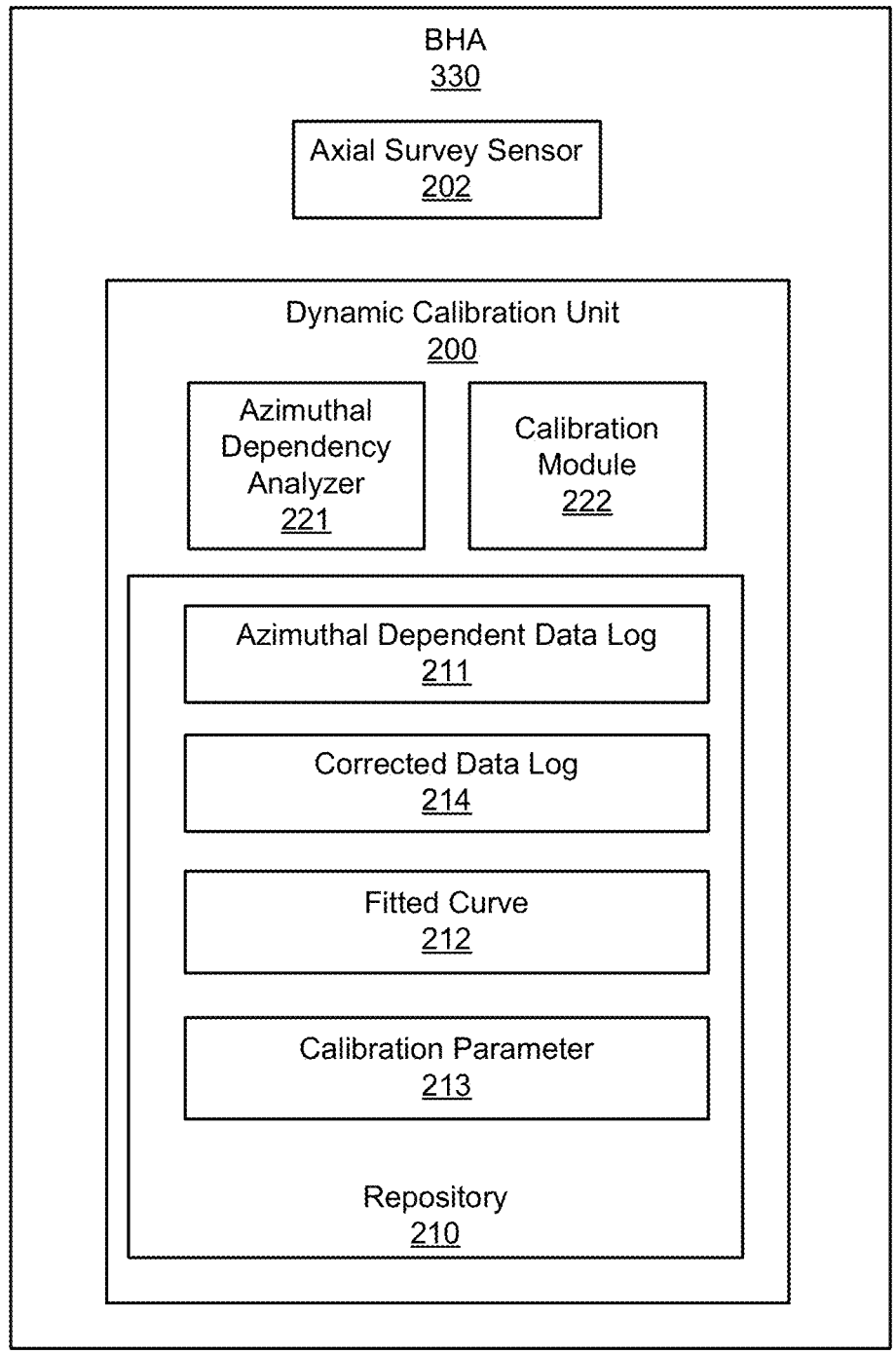
FIG. 1.2

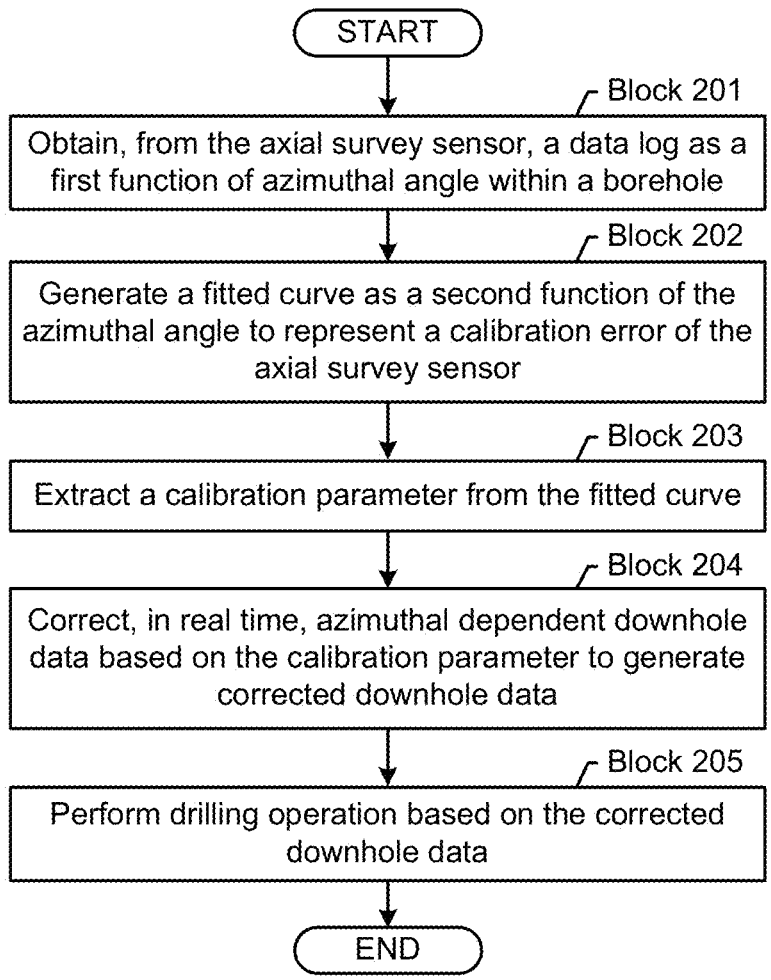
FIG. 2.1

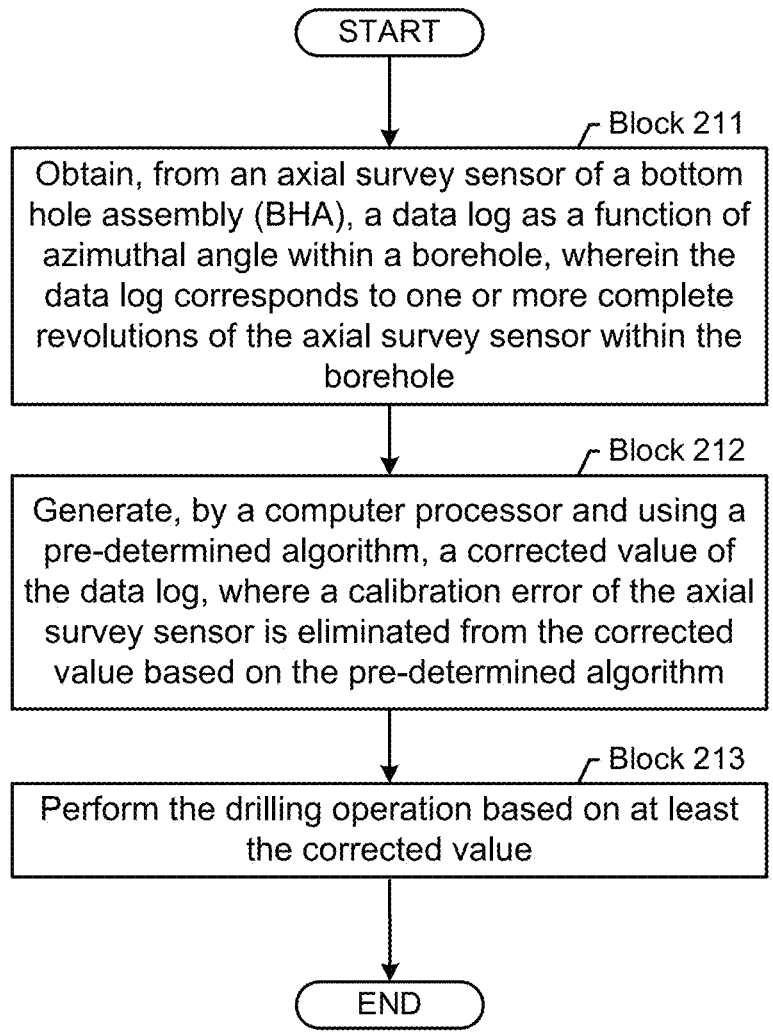
FIG. 2.2

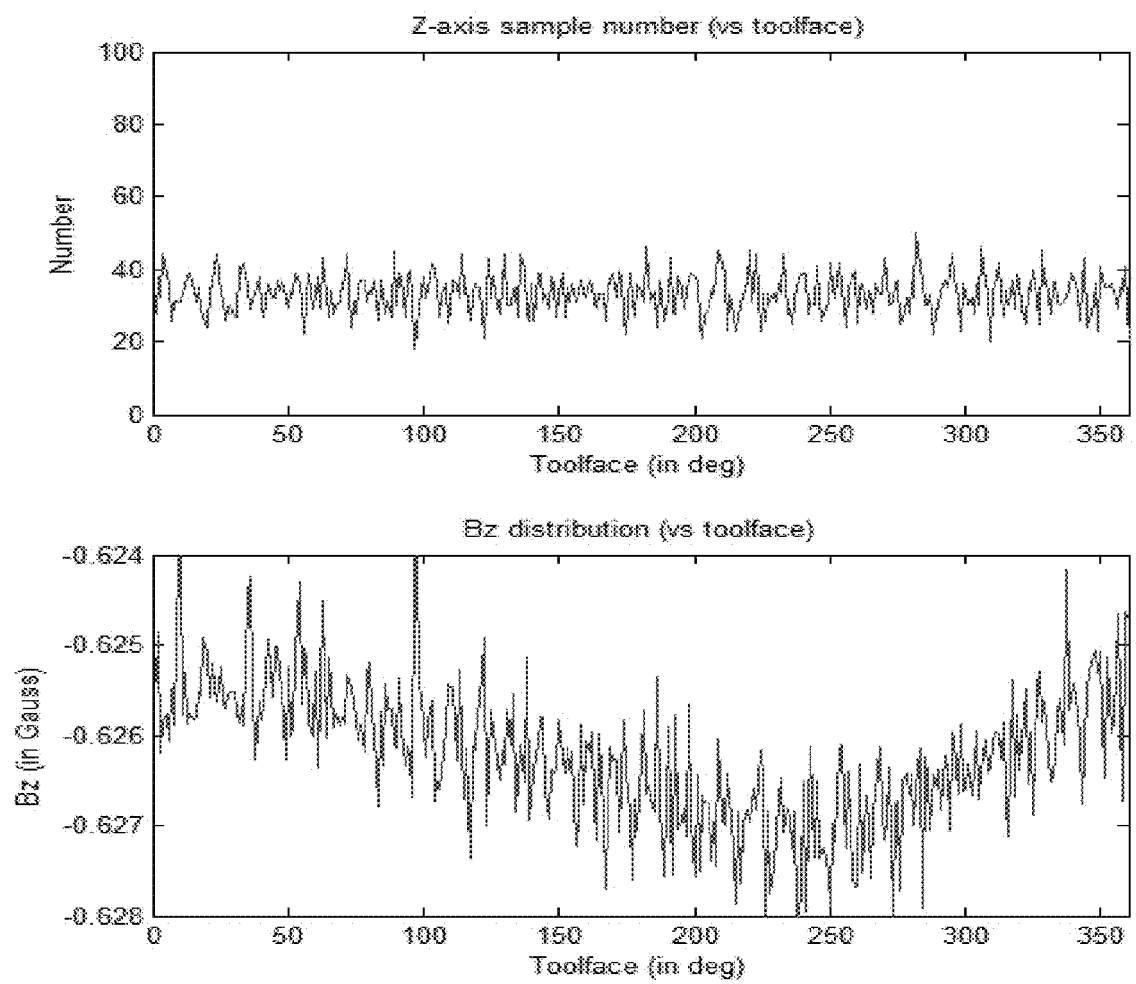
FIG. 3.1

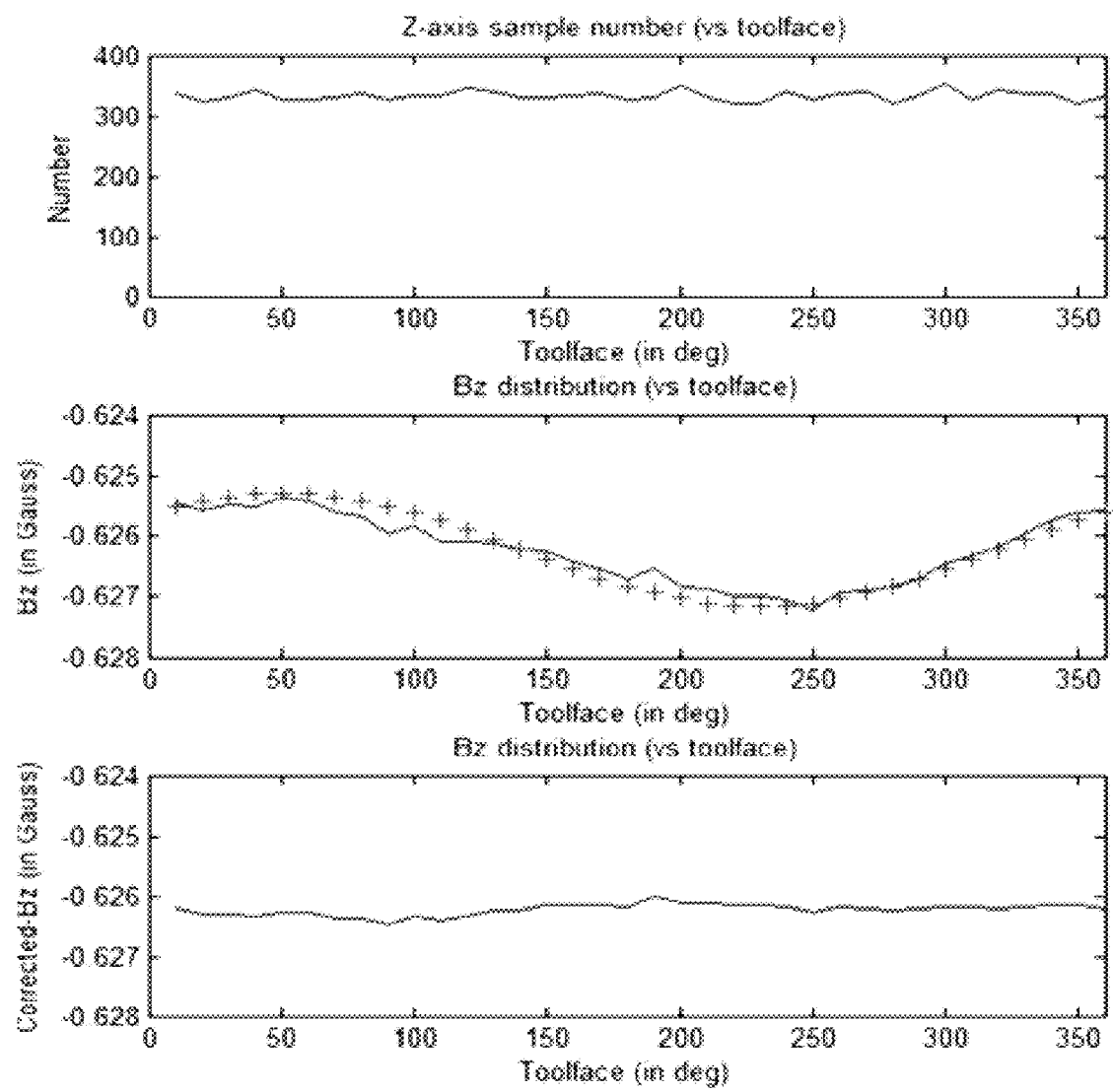
FIG. 3.2

DYNAMIC CALIBRATION OF AXIAL ACCELEROMETERS AND MAGNETOMETERS

CROSS REFERENCE TO RELATED APPLICATIONS

This application claims benefit under 35 U.S.C. § 119(e) of U.S. Provisional Patent Application No. 61/858,806, filed on Jul. 26, 2013, and entitled "Dynamic Calibration of Axial Accelerometers and Magnetometers," which is hereby incorporated by reference.

BACKGROUND

Tri-axial accelerometers and magnetometers are widely used in oil and gas well characterization to measure the components of gravitational g and the earth magnetic field intensity B in a tool coordinate system. By convention, the tool z-axis is the long axis of the tool, which corresponds to the borehole axis. The magnetometers and accelerometers are calibrated in a laboratory for scale factor, bias, and misalignment. These sensors are calibrated for temperatures up to their specifications (e.g., up to 150° C., 175° C., 200° C., etc). In addition, the validity of calibration is also periodically checked at room temperature.

While such laboratory calibration methods of sensors' scale factor, bias, misalignment, temperature work reasonably well downhole, these sensors still suffer from systematic errors due to the aging effect of sensors (e.g., sensor characteristic change over months from high-temperature and high-shock exposures), internal physical component change/damage, etc. Generally, such systematic errors could be observed in the field in-between calibration periods (every 2-3 months to 6 months). For example, bias errors greatly affect the results of accelerometers and magnetometers at near-vertical inclination and/or at directions near the magnetic dip axis. Axial sensor misalignment affects the measurement consistency and precision (resulting in misalignment errors) at near-horizontal inclination and/or at directions close to magnetic east/west, where axial accelerometer and/or magnetometer reading are very small. The aforementioned systemic errors, bias errors, and misalignment errors are referred to as calibration error throughout this disclosure.

SUMMARY

In general, in one aspect, the invention relate to a method to perform a drilling operation. The method includes (i) calibrating an axial survey sensor of a bottom hole assembly (BHA) by obtaining, from the axial survey sensor, a data log as a first function of azimuthal angle within a borehole, wherein the axial sensor comprises at least one selected from a group consisting of an accelerometer and a magnetometer, wherein the axial sensor is a part of at least one selected from a group consisting of a MWD tool, a LWD tool, a downhole imaging tool, a downhole motor, and a rotary steerable tool, and wherein the azimuthal angle is based on at least one selected from a group consisting of a gravity toolface, a magnetic toolface, and a gyro toolface, generating, by a computer processor of the BHA and using a pre-determined algorithm, a fitted curve as a second function of the azimuthal angle, wherein the fitted curve is generated based on the data log to represent a calibration error of the axial survey sensor, and extracting, by the computer processor of the BHA, a calibration parameter from the fitted curve, and (ii) performing the drilling operation using at least the axial survey sensor based on the calibration parameter, wherein the calibrating is performed during at least one selected from a group consisting of when the axial survey sensor is rotating and when the axial survey sensor is not rotating.

Other aspects of the invention will be apparent from the following detailed description and the appended claims.

BRIEF DESCRIPTION OF DRAWINGS

The appended drawings illustrate several embodiments of dynamic calibration of axial accelerometers and magnetometers and are not to be considered limiting of its scope, for dynamic calibration of axial accelerometers and magnetometers may admit to other equally effective embodiments.

FIG. 1.1 is a schematic view of a wellsite depicting a drilling operation in which one or more embodiments of dynamic calibration of axial accelerometers and magnetometers may be implemented.

FIG. 1.2 shows a system for dynamic calibration of axial accelerometers and magnetometers in accordance with one or more embodiments.

FIGS. 2.1-2.2 shows a flowchart of a method for dynamic calibration of axial accelerometers and magnetometers in accordance with one or more embodiments.

FIGS. 3.1-3.2 depict examples of dynamic calibration of axial accelerometers and magnetometers in accordance with one or more embodiments.

DETAILED DESCRIPTION

Figure 4:
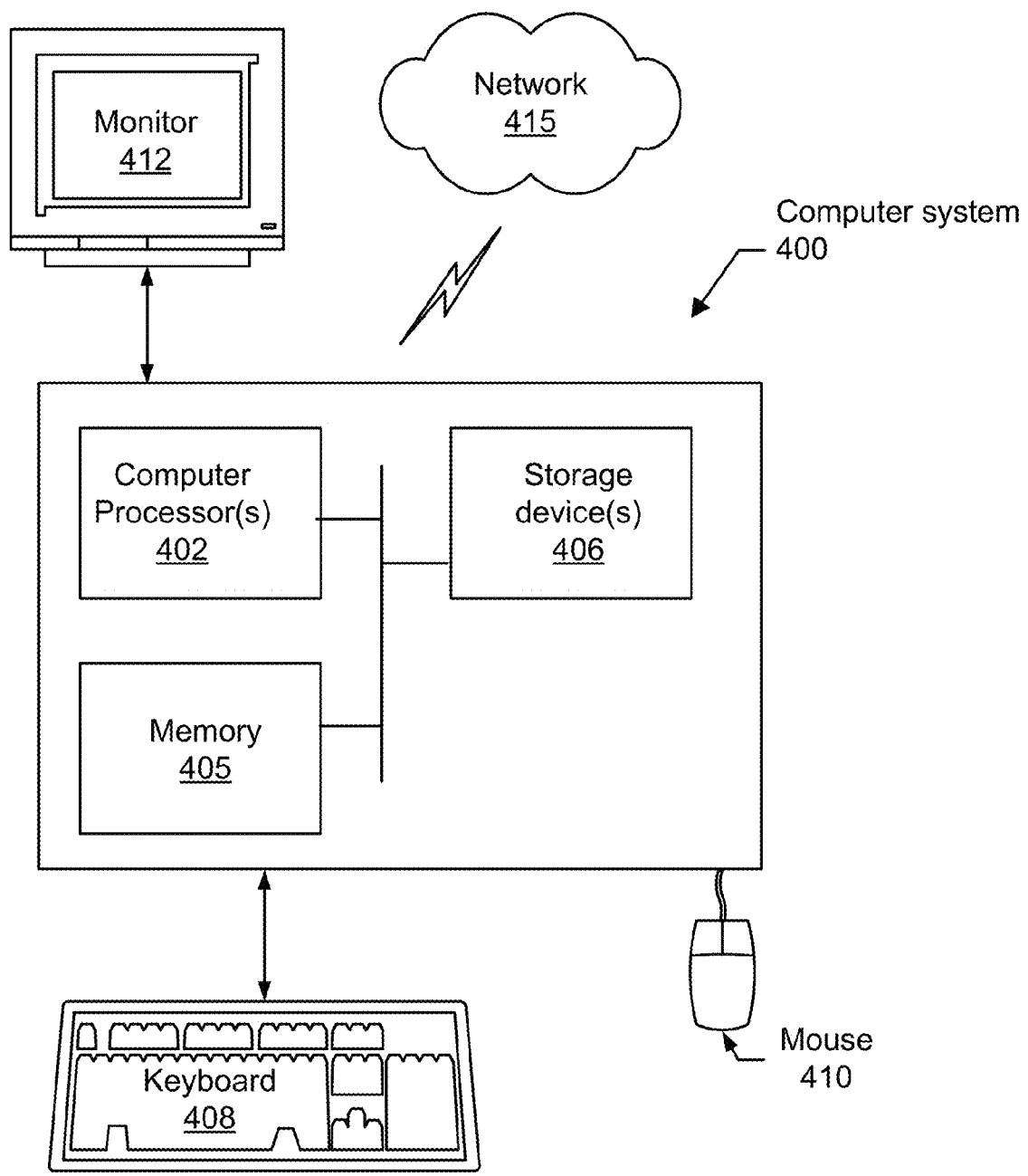
FIG. 4 depicts a computer system using which one or more embodiments of dynamic calibration of axial accelerometers and magnetometers may be implemented.

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

Dynamic survey refers to obtaining measurements from a survey sensor while the survey sensor is continuously rotating with the drill string. Static survey refers to obtaining measurements from the survey sensor while the survey sensor stops continuous rotation with the drill string. In the static survey, there may still be rotation of the sensor platform (and therefore the sensors mounted thereon) in some situations. For example, during normal condition in the static survey, the roll-stabilized platform may be stationary in a non-rotating phase or rotate at less than 5 rpm in a rotating phase, a slowly-rotating housing or a slowly-rotating sleeve housing may rotate at less than 20 revolutions per hour (rph). In one or more embodiments of dynamic calibration of axial accelerometers and magnetometers, the survey sensor is an axial magnetometer and/or accelerometer (generally referred to as an axial survey sensor), and the axial magnetometer and/or accelerometer measurements include information related to gravitational acceleration and the earth magnetic field.

Aspects of the present disclosure include a method, system, and computer readable medium for improving axial survey sensor measurements, such as axial magnetometer and accelerometer measurements. The method dynamically corrects for axial misalignment errors downhole. In other words, the axial misalignment errors are computed during a dynamic survey. The computed axial misalignment errors are applied back to subsequent static and dynamic surveys to improve the consistency and precision of inclination, azimuth, total magnetic field, total gravity field, and magnetic dip angle computations in both static and dynamic surveys. Further, the method is used in a rotary-steerable system to increase automated steering accuracy by improving static and dynamic survey consistency and precision.

FIG. 1.1 is a schematic view of a wellsite (100) depicting a drilling operation. The wellsite (100) includes a drilling system (311) and a surface unit (334). In the illustrated embodiment, a borehole (313) is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs.

The drilling system (311) includes a drill string (315) suspended within the borehole (313) with a drill bit (310) at its lower end. The drilling system (311) also includes the land-based platform and derrick assembly (312) positioned over the borehole (313) penetrating a subterranean formation (F). The assembly (312) includes a rotary table (314), kelly (316), hook (318) and rotary swivel (319). The drill string (315) is rotated by the rotary table (314), energized by means not shown, which engages the kelly (316) at the upper end of the drill string. The drill string (315) is suspended from hook (318), attached to a traveling block (also not shown), through the kelly (316) and a rotary swivel (319) which permits rotation of the drill string relative to the hook.

The drilling system (311) further includes drilling fluid or mud (320) stored in a pit (322) formed at the well site. A pump (324) delivers the drilling fluid (320) to the interior of the drill string (315) via a port in the swivel (319), inducing the drilling fluid to flow downwardly through the drill string (315) as indicated by the directional arrow. The drilling fluid (320) exits the drill string (315) via ports in the drill bit (310), and then circulates upwardly through the region between the outside of the drill string (315) and the wall of the borehole (313), called the annulus (326). In this manner, the drilling fluid (320) lubricates the drill bit (310) and carries formation cuttings up to the surface as it is returned to the pit (322) for recirculation.

The drill string (315) further includes the BHA (330), near the drill bit (310) (in other words, within several drill collar lengths from the drill bit). The BHA (330) includes capabilities for measuring, processing, and storing information, as well as communicating with the surface unit. The BHA (330) further includes drill collars (328) for performing various other measurement functions. In particular, the BHA (330) includes the dynamic calibration unit (200).

Sensors (S) are located about the wellsite to collect data, may be in real time, concerning the operation of the wellsite, as well as conditions at the wellsite. The sensors (S) may also have features or capabilities, of monitors, such as cameras (not shown), to provide pictures of the operation. Surface sensors or gauges (S) may be deployed about the surface systems to provide information about the surface unit, such as standpipe pressure, hook load, depth, surface torque, rotary rpm, among others. Downhole sensors or gauges (S) are disposed about the drilling tool and/or wellbore to provide information about downhole conditions, such as wellbore pressure, weight on bit, torque on bit, direction, inclination, collar rpm, tool temperature, annular temperature and toolface, among others. Multiple downhole sensors (S) may be located at different positions on BHA (330), such as sensor (201) and sensor (202). The information collected by the sensors and cameras is conveyed to the various parts of the drilling system and/or the surface unit (334).

The drilling system (311) is operatively connected to the surface unit (334) for communication therewith. The BHA (330) is provided with a communication subassembly (352) that communicates with the surface unit. The communication subassembly (352) is adapted to send signals to and receive signals from the surface using mud pulse telemetry. The communication subassembly (352) may include, for example, a transmitter that generates a signal, such as an acoustic or electromagnetic signal, which is representative of the measured drilling parameters. It will be appreciated by one of ordinary skill in the art that a variety of telemetry systems may be employed, such as mud pulse telemetry, wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may deviate from the drilling plan. Additionally, as drilling or other operations are performed, the subsurface conditions may change. The earth model may also be adjusted as new information is collected.

Although the subterranean assets are not limited to hydrocarbons such as oil, throughout this document, the terms "oilfield" and "oilfield operation" may be used interchangeably with the terms "field" and "field operation" to refer to a site where any type of valuable fluids can be found and the activities required for extracting them. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion, and/or production using the wellbore.

FIG. 1.2 is a schematic view of the BHA (330) with more details. In one or more embodiments of the invention, one or more of the modules and elements shown in FIG. 1.2 may be omitted, repeated, and/or substituted. Accordingly, embodiments of dynamic calibration of axial accelerometers and magnetometers should not be considered limited to the specific arrangements of modules shown in FIG. 1.2.

As shown in FIG. 1.2, the BHA (330) includes a sensor (202) and a dynamic calibration unit (200) for calibrating the sensor (202). In one or more embodiments, the sensor (202) is an axial accelerometer or an axial magnetometer, which may be part of a measurements-while-drilling (MWD) tool, a logging-while-drilling (LWD) tool, a downhole imaging tool, a downhole motor, or a rotary steerable tool. In one or more embodiments, the axial accelerometer or axial magnetometer may be located on a rotary steerable platform (e.g., rotating with the drill bit up to 250 rotations-per-minute (rpm) during drilling), roll-stabilized platform (e.g., rotating at less than 5 rpm), a non-rotating platform, a slowly-rotating housing (e.g., rotating at less than 20 rotations-per-hour (rph)), or a slowly-rotating sleeve housing with a controlled rotation speed (e.g., rotating at less than 20 rotations-per-hour (rph)). Examples of these platforms/housings are disclosed in U.S. Pat. Nos. 5,265,682, 5,353,884, 6,427,783, and/or 7,950,473. Further, the dynamic calibration unit (200) includes an azimuthal dependency analyzer (221), a calibration module (222), and a repository (210). In one or more embodiments, one or both of the azimuthal dependency analyzer (221) and the calibration module (222) is a software module executing on a computer processor (not shown) of the BHA (330), a hardware module (e.g., a digital circuitry, an analog circuitry, a programmable logic device, a field-programmable gate array, or a combination) installed on the BHA (330), or a combination thereof. The repository (210) may be a semiconductor based data storage device, a rotating disk based data storage device, or other suitable computer data storage. In particular, at least a portion of the repository (330) is subject to limitations (e.g., limited capacity) induced by downhole conditions, such as extreme temperature and/or shock/vibration. In one or more embodiments, a portion of the repository (330) may be located in the surface unit (334). As shown in FIG. 1.2, the repository (210) may store data log generated by the axial survey sensor (202), such as an azimuthal dependent data log (211). Further, the repository (210) may also store intermediate or end results of the dynamic calibration unit (200), such as a fitted curve (212), a calibration parameter (213), and a corrected data log (214).

In one or more embodiments, the azimuthal dependency analyzer (221) is configured to obtain, from the axial survey sensor (202), the azimuthal dependent data log (211) as a function of azimuthal angle within the borehole (313). In one or more embodiments, the azimuthal angle is based on a gravity toolface, a magnetic toolface, or a gyro toolface. In one or more embodiments, the azimuthal dependent data log (211) includes information related to gravitational acceleration and the earth magnetic field. While the gravitational acceleration and the earth magnetic field are substantially independent of the orientation of the axial survey sensor (202), the downhole data generated by the axial survey sensor (202) includes azimuthal angle dependent components, such as an azimuthal angle dependent calibration error.

Using a pre-determined algorithm, the azimuthal dependency analyzer (221) is further configured to generate a fitted curve (212) based on the azimuthal dependent data log (211) to represent a calibration error of the axial survey sensor (202). Specifically, the fitted curve (212) is also a function of the azimuthal angle. Accordingly, the calibration parameter (213) is extracted from the fitted curve by the azimuthal dependency analyzer (221). In one or more embodiments, the calibration is performed when the axial survey sensor (202) is rotating or when the axial survey sensor (202) is not rotating.

In one or more embodiments, the calibration module (222) is configured to calibrate the sensor (202) using the calibration parameter (213). For example, the corrected (i.e., calibrated) data log (214) may be generated by combining the azimuthal dependent data log (211) with a correction to the calibration error. As noted above, the calibration error is represented by the fitted curve (212). In one or more embodiments, the correction to the calibration error is determined at least based on the calibration parameter (213) that is extracted from the fitted curve (212). In one or more embodiments, multiple calibration parameters are extracted from the fitted curve (212) and used to determine the correction to the calibration error. In one or more embodiments, the calibration module (222) is configured to calibrate the sensor (202) in real time. In such embodiments, the fitted curve (212), the calibration parameter (213), and the corrected data log (214) are all generated from the same azimuthal dependent data log (211). In particular, they are generated within a pre-determined time period (e.g., 1 minute) after the azimuthal dependent data log (211) is obtained from the sensor (202). In one or more embodiments, the calibration module (222) is configured to calibrate the sensor (202) simultaneously with the drilling operation. For example, while a LWD tool with the sensor (202) installed thereon are rotating, the measurement of the navigational parameters (inclination, azimuth, gravity toolface, etc) occurs. At the same time, the dynamic calibration is performed by the calibration module (222). For example, the dynamic calibration of axial sensor occurs every minute, and at the end of this period, the correction factor is identified and a misalignment correction is applied for the next one minute. This process is repeated; and therefore, a new correction factor is determined every minute and dynamically compensates the calibration error downhole.

In summary, the azimuthal dependency analyzer (221) dynamically calculates axial misalignment errors of the sensor (202) downhole (while drilling). The computed axial misalignment errors are applied back to static surveys by the calibration module (222). As a result, the consistency and precision of inclination, azimuth, total magnetic field, total gravity field, magnetic dip angle computations are improved both in static and dynamic surveys. As is known in the art, static survey is taken when the tool is not rotating (i.e., not drilling) and dynamic (or continuous) survey is taken while the tool is drilling ahead.

In one or more embodiments, the drilling operation is based on one or more of MWD, LWD, LWD imaging, and rotary steerable tools with the axial survey sensor (202) packaged in rotating, slowly-rotating, or semi-rotating (roll-stabilized) housings. Accordingly, the drilling operation is improved because of more accurate data log from the axial survey sensor (202) based on the calibration parameter (213). For example, the drilling operation may use a rotary-steerable system where automated steering accuracy is enhanced by improving static and dynamic survey consistency and precision.

Examples of generating the fitted curve (212), extracting the calibration parameter (213), and other aspects of dynamic calibration for axial accelerometers and magnetometers are described in reference to FIGS. 3.1 and 3.2 below.

FIG. 2.1 shows a method flowchart in accordance with one or more embodiments of the invention. In one or more embodiments of the invention, the method of FIG. 2.1 may be practiced using the BHA (330) described in reference to FIG. 1.2 above. In one or more embodiments of the invention, one or more of the Blocks shown in FIG. 2.1 may be omitted, repeated, and/or performed in a different order than that shown in FIG. 2.1. Accordingly, the specific arrangement of Blocks shown in FIG. 2.1 should not be construed as limiting the scope of the invention.

The method flowchart depicted in FIG. 2.1 relates to performing a drilling operation. Specifically, Blocks 201, 202, and 203 relate to calibrating an axial survey sensor of a bottom hole assembly (BHA), while Blocks 204 and 205 relate to performing the drilling operation based on corrected downhole data generated using the calibrated axial survey sensor.

Initially in Block 201, a data log is obtained from the axial survey sensor as a first function of azimuthal angle within a borehole. In one or more embodiments, the data log corresponds to a range of azimuthal angles of the axial survey sensor within the borehole. In particular, the data log includes a collection of downhole data generated by the axial survey sensor oriented at multiple azimuthal angles throughout the azimuthal range within the borehole.

In one or more embodiments, the axial survey sensor includes an accelerometer and/or a magnetometer. Specifically, the axial sensor is a part of a MWD tool, a LWD tool, a downhole imaging tool, a downhole motor, and/or a rotary steerable tool. In addition, the azimuthal angle is based on a gravity toolface, a magnetic toolface, or a gyro toolface. In one or more embodiments, the data log includes information related to gravitational acceleration and the earth magnetic field. While the gravitational acceleration and the earth magnetic field are substantially independent of the orientation of the axial survey sensor, the downhole data generated by the axial survey sensor includes azimuthal angle dependent components, such as the calibration error that is azimuthal angle dependent.

In one or more embodiments, a drill string is continuously rotating within the borehole during the calibration, referred to as a dynamic calibration. In other words, the dynamic calibration is performed using a dynamic survey when the axial survey sensor is continuously rotating with the drill string. In such embodiments, each data item of the data log is generated by the axial survey sensor as the azimuthal angle of the axial survey sensor increments during one or more revolutions of the drill string.

In one or more embodiments, the drill string stops continuous rotation within the borehole during the calibration, referred to as a static calibration. For example, the static calibration may be performed using multiple static surveys by sequentially orienting the axial survey sensor at multiple stationary azimuthal angles. In such embodiments, each data item of the data log is generated by the axial survey sensor, oriented at a particular stationery azimuthal angle, before the axial survey sensor is incrementally turned to another stationery azimuthal angle for generating the subsequent data item in the data log.

In one or more embodiments, the data log may be obtained using an accelerometer or magnetometer located on various sensor mounting platforms, such as a rotary steerable platform, a roll-stabilized platform, a non-rotating platform, or a slowly-rotating housing of the BHA.

In Block 202, a fitted curve is generated by a computer processor of the BHA and using a pre-determined algorithm. In particular, the fitted curve is generated as a second function of the azimuthal angle. Specifically, the fitted curve is generated based on the data log to represent a calibration error of the axial survey sensor. In one or more embodiments, the fitted curve is a mathematical SINE function of the azimuthal angle, where the period of the SINE function corresponds to one complete revolution of the axial survey sensor within the borehole.

In Block 203, a calibration parameter is extracted from the fitted curve by the computer processor of the BHA. In one or more embodiments, the calibration parameter includes a peak-to-peak amplitude and a phase shift angle of the SINE function.

In Block 204, during either a dynamic survey or a static survey subsequent to the calibration, azimuthal dependent downhole data is corrected in real time based on the calibration parameter to generate corrected downhole data. In particular, the azimuthal dependent downhole data includes a measurement generated by the axial survey sensor oriented at a particular azimuthal angle. The azimuthal angle associated with the azimuthal dependent downhole data is then used to predict the calibration error based on the calibration parameter. For example, the azimuthal angle and the calibration parameter are used as inputs to the SINE function to generate an output that represents the predicted calibration error at the particular azimuthal angle. Accordingly, the predicted calibration error is removed (e.g., subtracted) from the azimuthal dependent downhole data to generate the corrected downhole data.

In Block 205, the drilling operation is performed using at least the axial survey sensor based on the calibration parameter. Specifically, the drilling operation is performed based on the corrected downhole data that is calibrated in real time.

Examples of generating the fitted curve, extracting the calibration parameter, and other aspects of calibrating the axial survey sensor are described in reference to FIGS. 3.1 and 3.2 below.

FIG. 2.2 shows a method flowchart in accordance with one or more embodiments of the invention. In one or more embodiments of the invention, the method of FIG. 2.2 may be practiced using the BHA (330) described in reference to FIG. 1.2 above. In one or more embodiments of the invention, one or more of the Blocks shown in FIG. 2.2 may be omitted, repeated, and/or performed in a different order than that shown in FIG. 2.2. Accordingly, the specific arrangement of Blocks shown in FIG. 2.2 should not be construed as limiting the scope of the invention.

The method flowchart depicted in FIG. 2.2 relates to performing a drilling operation as directed by an output generated by an axial survey sensor of a bottom hole assembly (BHA). In one or more embodiments, the output of the axial survey sensor is automatically corrected during a dynamic survey to eliminate calibration error without performing a separate calibration of the axial survey sensor. In one or more embodiments, the output of the axial survey sensor is automatically corrected using multiple static surveys to eliminate calibration error without performing a separate calibration of the axial survey sensor.

In Block 211, a data log is obtained from the survey sensor, as a function of azimuthal angle within a borehole. In one or more embodiments, the data log corresponds to one or more complete revolutions of the axial survey sensor within the borehole. In particular, the data log includes a collection of downhole data generated by the axial survey sensor oriented at multiple azimuthal angles throughout each revolution within the borehole.

In one or more embodiments, a drill string is continuously rotating within the borehole when the data log is obtained during a dynamic survey. In other words, the data log is obtained during the dynamic survey when the axial survey sensor is continuously rotating with the drill string. In such embodiments, each data item of the data log is generated by the axial survey sensor as the azimuthal angle of the axial survey sensor increments during one or more revolutions of the drill string.

In one or more embodiments, the drill string stops continuous rotation within the borehole when the data log is obtained in multiple static surveys. For example, the data log may be obtained using multiple static surveys by sequentially orienting the axial survey sensor at multiple stationery azimuthal angles. In such embodiments, each data item of the data log is generated by the axial survey sensor, oriented at a particular stationery azimuthal angle, before the axial survey sensor is incrementally turned to another stationery azimuthal angle for generating the subsequent data item in the data log.

In one or more embodiments, the data log may be obtained using an accelerometer or magnetometer located on various sensor mounting platforms, such as a rotary steerable platform, a roll-stabilized platform, a non-rotating platform, or a slowly-rotating housing of the BHA.

In Block 212, during either the dynamic survey or the multiple static surveys described in Block 211 above, a corrected value of the data log is generated by a computer processor, using a pre-determined algorithm. The computer processor may be part of the BHA or at a processing facility at the surface (e.g. a surface unit). Specifically, a calibration error of the axial survey sensor is eliminated from the corrected value (referred to as the corrected downhole data) based on the pre-determined algorithm. In one or more embodiments, the calibration error is represented or predicted by the pre-determined algorithm as a mathematical SINE function of the azimuthal angle, where the period of the SINE function corresponds to one complete revolution of the axial survey sensor within the borehole. Because the data log corresponds to complete revolution(s), i.e., complete period(s) of the SINE function, the calibration errors associated with each and every data item of the data log are mathematically cancelled out by summing all data items of the data log. Accordingly, the corrected downhole data is generated as the summation of all data items of the data log. In one or more embodiments, the corrected downhole data is further normalized based on a normalization factor specified in the pre-determined algorithm.

In Block 213, the drilling operation is performed based on the corrected downhole data that is automatically calibrated as described above. Examples of generating the corrected downhole data that is automatically calibrated are described in reference to FIGS. 3.1 and 3.2 below.

FIGS. 3.1-3.2 depict examples of dynamic calibration of axial accelerometers and magnetometers in accordance with one or more embodiments. In one or more embodiments of the invention, the example shown in FIGS. 3.1-3.2 may be practiced using the BHA (330) described in reference to FIG. 1.2 and the method flowcharts described in reference to FIGS. 2.1 and 2.2.

By convention, the gravitational field is considered to be positive pointing downward (i.e., toward the center of the earth), while the magnetic field is considered to be positive pointing towards magnetic north. Moreover, also by convention, the y-axis is aligned with the toolface reference axis. Specifically, the gravity toolface (GTF) equals zero when the y-axis is along the opposite direction of the gravity field vector and the magnetic toolface (MTF) equals zero when the y-axis is pointing towards magnetic north. Accordingly, the magnetic toolface MTF is projected in the xy plane and may be represented mathematically as: $\tan(MTF)=B_x/B_y$. Likewise, the gravity toolface GTF may be represented mathematically as: $\tan(GTF)=A_x/A_y$. Here, $(B_x, B_y)$ and $(A_x, A_y)$ represent measurement results of the axial accelerometer and magnetometer, respectively.

An example of axial misalignment can be observed in downhole recorded data shown in FIG. 3.1. Specifically, FIG. 3.1 shows axial magnetometer data with magnetic toolface dependency (or azimuthal dependency). On top and bottom plots in FIG. 3.1, X-axis is discretized magnetic toolface (every 1 degree), having 360 azimuthal sectors. Y-axis on the top plot shows the number of samples observed on each discrete toolface over a 2-minute period (i.e., sampled at 100 Hz and there are 12000 samples). The bottom plot shows the mean axial magnetic field strength for each discrete toolface (in this case, every 1 degree). As can be seen, the axial magnetic strength is highly correlated to the magnetic toolface angle, even though noise appears due to statistical errors (on average 33.3 samples per discrete toolface).

Axial misalignment correction may be made by characterizing its toolface dependency on axial measurement (either $B_z$ or $A_z$). The correction algorithm follows the following steps:

1) Compute mean axial magnetic/gravity field strength for each discrete toolface
2) Fit a sine wave to the discrete data points.
3) Store the scale factor, offset and phase information of the fitted sine wave in memory In the while-drilling axial misalignment method, the corrected axial value is the "offset" of the fitted sine wave. Alternatively, the arithmetic mean of all the averaged discrete data points (computed in Step 1) may be used.

4) The memory-stored sine-wave parameters (scale factor, offset, and phase) can be applied back to the next static survey in order to increase survey consistency and precision.

FIG. 3.2 shows an example of axial magnetometer misalignment correction. In FIG. 3.2, x-axis is discretized magnetic toolface (every 10 degree), having 36 azimuthal sectors. The top plot shows the number of samples observed at each discrete magnetic toolface (every 10 degrees). These samples may represent axial magnetometer measurements obtained during a dynamic survey or obtained during multiple static surveys.

The middle plot shows the mean axial magnetic field strength for each discrete toolface, superimposed with a fitted sine wave (shown with crosses (+++)). In one scenario, based on the method flowchart depicted in FIG. 2.1 above, the sine wave is used to extract calibration parameter(s) that are in turn used to correct subsequent axial magnetometer measurements. In another scenario, based on the method flowchart depicted in FIG. 2.2 above, the mean axial magnetic field strength for each discrete toolface is included in a summation to cancel out the sine wave, thus generating the corrected axial magnetometer measurement.

The bottom plot shows the corrected axial magnetic field strength based on the method flowchart depicted in FIG. 2.1 above. As can be seen from the middle plot, the axial magnetometer strength is toolface-dependant and when the tool stops at the minimum or maximum point for static survey, the survey error will be maximized without any dynamic calibration.

The fitted sine wave can be expressed in SCALE*sin($\varphi$−$\theta$)+OFFSET. As described below, SCALE, OFFSET and $\theta$ (phase shift toolface angle in degrees) of the fitted sine wave may be determined from the axial magnetometer measurements (i.e., the mean axial magnetic field strength shown in the middle plot).

By looking at the middle plot of FIG. 3.2, the upper peak value (the maximum) is about −0.6253 Gauss. The lower peak value (the minimum) is −0.627 Gauss. Therefore, the average value over 0-360 deg. is ((−0.627)+(−0.6253))/2=−1.2523/2=−0.62615 Gauss. This average value becomes the OFFSET of the fitted sine wave.

The peak-to-peak value is (−0.6253−(−0.627))=0.0017 Gauss. The peak value is (0.0017/2)=0.00085 Gauss. This peak value is used as the SCALE factor.

The upper peak value (the maximum=−0.6253) occurs around 53 deg. The lower peak value (the minimum=−0.627) occurs around 233 deg. The phase shift angle (in degrees) can be determined by averaging these angles [$\theta$=(53+233)/2=286/2=143 deg.]. The in-phase angle is 143+180=323 deg. And the out-phase angle is 143 deg.

Accordingly, the fitted sine wave is 0.00085*sin($\varphi$−323)−0.62615, which is an in-phase sine wave (Equation 1).

The correction sine wave is 0.00085*sin($\varphi$−143)−0.62615, which is an out-phase sine wave (Equation 2). This correction can be added to the mean axial magnetic field strength (shown in the middle plot) and divided by 2 to generate the corrected axial magnetic field strength shown in the bottom plot. This operation (adding the out-phase sine wave) ensures that the sine wave (azimuthal dependency of the axial accelerometer response) be canceled.

The corrected $B_z$ at the toolface $\varphi$ is expressed as Equation 3 below:

$$B_z\_\text{corrected}(\varphi)=(B_z(\varphi)+(0.00085*\sin(\varphi-143)-0.62615))/2 \quad \text{Equation 3}$$

The correction sine wave (Equation 2) can be computed while the sensor is rotated. And, the corrected axial sensor value at $\varphi$ can be determined by using Equation 3 whether the sensor is rotating or not. Said in other words, sensors must be rotated to generate the azimuthal dependency plot, but once the correction factor is determined, the correction can be applied anytime while the tool is rotating or not rotating.

In the example described above, a least-computationally-expensive sine-wave fitting algorithm is used. As a result, the fitting is not perfect and some residual errors can be observed in the corrected plot. However, other sine-wave fitting algorithms are available with an expense of more intensive computation, such as least-square sine wave fitting (three-dimensional search) and/or discrete Fourier-transform-based sine-wave fitting. Instead of using sine-wave fitting, a polynomial fitting or triangle-wave fitting (with less accuracy/precision) may also be used. These curve fitting methods are known in the art and this invention is not limited by any particular sine-wave fitting method.

The method described above may be applied to MWD tools, LWD tools, LWD imaging tools, and RSS tools (including strap-down RSS, roll-stabilizer-based RSS, and RSS with non-rotating/slowly-rotating sections). In addition, the method described above may be used in conjunction with conventional laboratory-performed (shop-performed) static calibration and/or temperature calibrations. Further, for toolface reference, magnetic toolface, gravity toolface and calibrated gyro toolface may be used. In this document, the word "toolface angle" may be used interchangeably with "roll angle" and/or "azimuthal angle."

Discrete azimuthal data points may be further filtered along the discrete toolface axis. As can be seen in FIG. 3.1 on the bottom plot, the data is very noisy and a very noisy sine wave can be recognized. The idea is to apply a low-pass filter (such as mean filter) in the x-axis direction on the discredited toolface. After this operation, the bottom plot should look more like a sine wave that can see in the middle plot of FIG. 3.2.

Discrete azimuthal sectors between 4 and 40 (the sector angles between 90 degrees and 9 degrees) may be used. For example, 360 discrete values of toolface are used in FIGS. 3.1 and 36 discrete values of toolface are used in FIG. 3.2.

Data validity checks may be performed prior to binning and/or discretization. For example, if the data point value is very different from the previously computed mean, that data point may be thrown out.

Embodiments of dynamic calibration of axial accelerometers and magnetometers may be implemented on virtually any type of computer regardless of the platform being used. For instance, as shown in FIG. 4, a computer system (400) includes one or more computer processor(s) (402) such as a central processing unit (CPU) or other hardware processor, associated memory (405) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display LCD, a plasma display, or cathode ray tube (CRT) monitor). The computer system (400) may be connected to a network (415) (e.g., a local area network (LAN), a wide area network (WAN) such as the Internet, or any other similar type of network) via a network interface connection (not shown). Those skilled in the art will appreciate that many different types of computer systems exist (e.g., workstation, desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (400) includes at least the minimal processing, input, and/or output means necessary to practice one or more embodiments.

Further, those skilled in the art will appreciate that one or more elements of the aforementioned computer system (400) may be located at a remote location and connected to the other elements over a network. Further, one or more embodiments may be implemented on a distributed system having a plurality of nodes, where each portion of the implementation may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

Dynamic calibration of axial accelerometers and magnetometers has been described with respect to a limited number of embodiments, those skilled in the art, having benefit of this disclosure, will appreciate that other embodiments may be devised which do not depart from the scope of dynamic calibration of axial accelerometers and magnetometers as disclosed herein. For example, curve fitting described throughout this disclosure may be solved using software, firmware, FPGA (Field-Programmable Gate Array), hardware (e.g., including analog or digital circuits), or combinations thereof. Accordingly, the scope of dynamic calibration of axial accelerometers and magnetometers should be limited only by the attached claims.

What is claimed is:

1. A method for making survey measurements while performing a drilling operation in a subterranean wellbore, the method comprising:
   (a) rotating a drill string in a subterranean wellbore, the drilling string including an axial survey sensor deployed therein, the axial survey sensor having an unknown misalignment with a longitudinal axis of the drill string;
   (b) calibrating the axial survey sensor by:
      (i) causing the axial survey sensor to continuously make axial survey measurements while rotating in (a) to acquire a data log;
      (ii) causing a downhole processor to group the axial survey measurements in the data log into a plurality of discrete azimuthal sectors;
      (iii) causing the downhole processor to compute a mean axial survey measurement value for each of the discrete azimuthal sectors;

(iv) causing the downhole processor to fit a mathematical function of azimuth to the mean axial survey measurement values computed in (iii);
(v) causing the downhole processor to process the mathematical function to compute a correction function, the correction function being a mathematical function of the azimuth angle;
(c) causing the axial survey sensor to acquire an axial survey measurement; and
(d) causing the downhole processor to combine the axial survey measurement and the correction function to compute a calibrated axial survey measurement.

2. The method of claim 1, wherein the axial survey sensor comprises at least one of an accelerometer and a magnetometer.

3. The method of claim 1, wherein the axial survey sensor is a part of at least one selected from a group consisting of a MWD tool, a LWD tool, a downhole imaging tool, a downhole motor, and a rotary steerable tool.

4. The method of claim 1, wherein the azimuth angle is based on at least one selected from a group consisting of a gravity toolface, a magnetic toolface, and a gyro toolface.

5. The method of claim 1, wherein the axial survey measurement acquired in (c) is a dynamic survey measurement acquired while the drill string is rotating in (a).

6. The method of claim 1, wherein the axial survey measurement acquired in (c) is a static survey measurement acquired while the drill string is not rotating.

7. The method of claim 1, wherein (b) (iv) comprises causing the downhole processor to fit a sine function to the mean axial survey measurement values computed in (iii).

8. The method of claim 7, wherein the correction function is a sine function.

9. The method of claim 1, wherein rotating the drill string in (a) drills the subterranean wellbore, the method further comprising:
(e) performing the drilling operation in (a) using the calibrated axial survey measurement computed in (d).

10. The method of claim 9, wherein the calibrated axial survey measurement computed in (d) is used in (e) to make automated steering decisions while drilling in (a).

11. The method of claim 9, further comprising:
(f) repeating the calibrating in (b) at a predetermined time interval to compute an updated correction function.

12. The method of claim 1, wherein the axial survey measurements acquired in (c) are automatically calibrated in (d).

13. A system for performing a drilling operation in a subterranean wellbore, the system comprising:
a drill string deployed in the subterranean wellbore, the drill string including a bottom hole assembly (BHA) having an axial survey sensor configured to acquire axial survey measurements while the drill string rotates in the wellbore;
a processor deployed in the BHA, the processor configured to:
(i) cause the axial survey sensor to continuously make axial survey measurements while the drill string rotates to acquire a data log;
(ii) group the data points in the data log into a plurality of discrete azimuthal sectors;
(iii) compute a mean axial survey measurement value for each of the discrete azimuthal sectors;
(iv) fit a mathematical function of azimuth to the mean axial survey measurement values computed in (iii);
(v) process the mathematical function to compute a correction function, the correction function being a mathematical function of the azimuth angle;
(vi) combine an axial survey measurement and the correction function to compute a calibrated axial survey measurement; and
(vii) use the calibrated axial survey measurement in a drilling operation.

14. The system of claim 13, wherein the axial survey sensor comprises at least one of an accelerometer and a magnetometer.

15. The system of claim 13, wherein the axial survey sensor is a part of at least one selected from a group consisting of a MWD tool, a LWD tool, a downhole imaging tool, a downhole motor, and a rotary steerable tool.

* * * * *